(12) United States Patent
Ponzini (10) Patent No.: US 8,690,263 B2
(45) Date of Patent: Apr. 8, 2014

(54) METHOD FOR MANUFACTURING A TOOTHBRUSH AND A BRISTLE HEAD THEREOF, TOOTHBRUSH OBTAINED BY SAID METHOD AND MOULD FOR SUCH METHOD

(71) Applicant: Ponzini S.p.A., Lazzate (IT)

(72) Inventor: Eligio Ponzini, Milan (IT)

(73) Assignee: Ponzini S.p.A., Lazzate (Milan) (IT)

( * ) Notice: Subject to any disclaimer, the term of this patent is extended or adjusted under 35 U.S.C. 154(b) by 0 days.

(21) Appl. No.: 13/738,440

(22) Filed: Jan. 10, 2013

(65) Prior Publication Data

US 2013/0147254 A1 Jun. 13, 2013

Related U.S. Application Data

(62) Division of application No. 12/349,092, filed on Jan. 6, 2009, now Pat. No. 8,376,470.

(30) Foreign Application Priority Data

Jan. 7, 2008 (IT) .............................. MI2008A0014
Mar. 17, 2008 (IT) .............................. MI2008A0447

(51) Int. Cl.
*A46D 3/04* (2006.01)
(52) U.S. Cl.
USPC ................................ 300/21; 300/6; 15/167.1
(58) Field of Classification Search
USPC ....................................... 300/6, 21; 15/167.1
See application file for complete search history.

(56) References Cited

U.S. PATENT DOCUMENTS

| 4,691,405 | A | 9/1987 | Reed |
| 6,464,920 | B1 | 10/2002 | Kramer |
| 8,297,710 | B2* | 10/2012 | Sakurai et al. .................. 300/21 |
| 2003/0131433 | A1 | 7/2003 | Pavone |
| 2007/0006410 | A1* | 1/2007 | Kraemer ...................... 15/167.1 |
| 2011/0225758 | A1* | 9/2011 | Chung ......................... 15/167.1 |

OTHER PUBLICATIONS

European Search Report, Dated Jan. 26, 2011, in EP 10190377.

* cited by examiner

*Primary Examiner* — Lee D Wilson
*Assistant Examiner* — Shantese McDonald
(74) *Attorney, Agent, or Firm* — Young & Thompson

(57) ABSTRACT

A molding process and a mold for manufacturing a toothbrush of plastic material with a resistant inner core, is disclosed. It is provided to manufacture a resistant inner core, and to introduce it into a mold cavity having opposite footprints belonging to a lower half-mold and an upper half-mold and to subsequently inject molten plastic material into the mold cavity for manufacturing at least part of the toothbrush handle. A resistant metal core is placed into a respective footprint of the lower half-mold in contact with at least two support platforms, adapted to support the core in the proximity of a central line of the mold cavity, and before the injection of structural plastic material, to couple the lower half-mold with an upper half-mold having at least one ribbing to contact with the metal core at least in a position between the support platforms and in a position opposite thereto.

11 Claims, 10 Drawing Sheets

METHOD FOR MANUFACTURING A TOOTHBRUSH AND A BRISTLE HEAD THEREOF, TOOTHBRUSH OBTAINED BY SAID METHOD AND MOULD FOR SUCH METHOD

FIELD OF THE INVENTION

The present invention refers to a process for manufacturing a toothbrush and a bristle head thereof, as well as to the mould for such method.

BACKGROUND ART

It is known that toothbrushes of the most varied shapes and constructions are common on the market. Toothbrushes displaying a metal portion within the handle have also been on offer, especially in the past. An example is disclosed in GB 2050156.

The need has recently arisen to manufacture a toothbrush consisting mainly of plastic material (essentially polypropylene and elastomere), for it to appeal in terms of handling and to be resistant to external agents (water, toothpaste, and so on), but also being provided with a particularly sturdy inner core, such as a metal core.

A metal-core toothbrush has some significant advantages over conventional, full-plastic toothbrushes. Firstly, the metal material (or equivalent), having a much larger elastic modulus than plastic materials, allows to achieve greater strength, longer duration and innovative elastic properties. Moreover, due to the increased strength of the material, it is possible to largely reduce the dimensions—in particular the resistant section—of the structural part of the toothbrush, for example of the neck portion between the handle and the bristle head. That makes the toothbrush ergonomically more advantageous, because it stands apart for its slimness precisely in the portion which interferes with the user's mouth and where it is hence most appreciated when the bulk is minimal. Increased ergonomics also translate into better manoeuvrability and, in the last analysis, in increased cleaning effectiveness.

The plastic component, in addition to pleasant tactile sensations, ensures good protection of the metal component from any oxidation or contact with the mouth lining (which contact might underlie allergic reactions).

Furthermore, the combination of the metal component with the plastic component, provided the latter is sufficiently clear, allows to obtain innovative and valuable aesthetic effects.

Finally, the presence of a core of a material with a high specific weight allows to achieve innovative results in terms of the weight and balancing of the toothbrush.

Beyond these immediately understandable aspects, the known art does not offer yet an effective process to be able to assemble a plastic toothbrush with a metal core. As a matter of fact, technological difficulties exist in combining these two so incompatible materials, both in terms of their nature, and in terms of processing.

In particular, it is necessary to identify a configuration and a process suitable for maintaining the inner core securely fastened in the mould and suitably exposed to be able to embed it and join it correctly to the plastic material injected into the mould.

Moreover, it would also be desirable to be able to have a process available which allows to introduce the use of a core into a toothbrush moulding method which, by becoming consolidated, has already allowed to achieve excellent results in terms of quality, economy and yield.

Moreover, in the toothbrush moulding process, the need arises to tuft the head portion by resorting to in-moulding or anchor-less processes, for the entire manufacturing process to remain effective and for it to be able to exploit uniform equipment.

However, it has been detected that these techniques still have drawbacks ensuing from the moulding of plastic material in the proximity of an enlarged portion of tuft root.

As a matter of fact, once the tufts have been processed to obtain an enlarged end or head, there are essentially two ways to anchor them to the remaining toothbrush portion. A first way provides to introduce the tufts into a suitable mould mask and hence to inject the remaining toothbrush head portion, wherein the enlarged ends remain embedded and joined together. In this case it is possible to suitably configure the mould and the mask to reduce to a minimum the problems during plastic injection.

A second way provides to introduce and fasten the tufts on a plate intended to then be fastened to the remaining toothbrush portion, which it will permanently form a part of.

In this last case, evidently, the plate is a toothbrush component which hence, both in terms of material and of the configuration, cannot be best adapted based solely on moulding requirements. It may therefore happen that, should it be required to inject molten plastic under pressure in the proximity of such component, leaks of material occur between the individual tufts and the respective housing holes.

Figures 6, 6A:
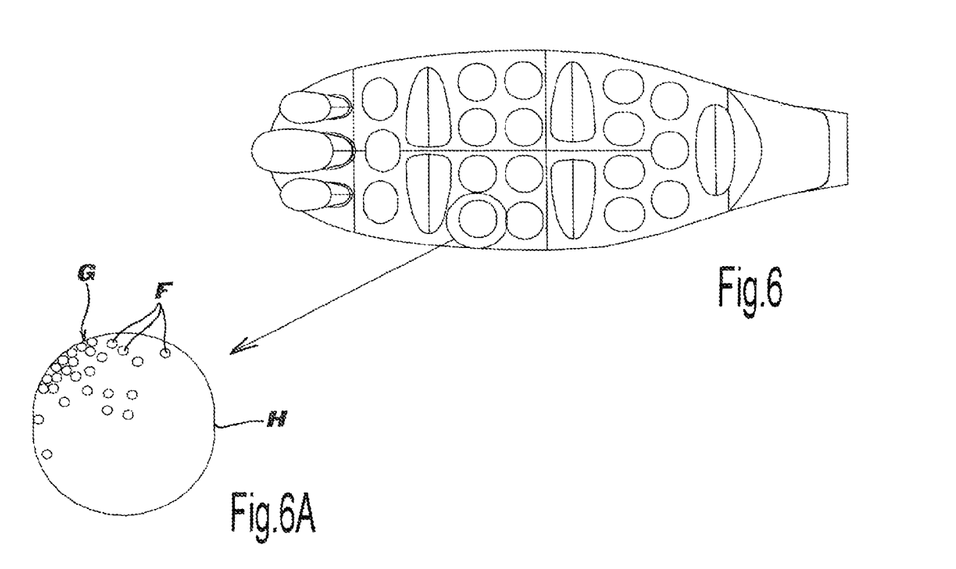
FIG. 6, as mentioned, is a top plan view of a bristle head, whereof
FIG. 6A shows a partial enlargement of some filaments introduced in a respective hole.

This happens because the individual tufts are inserted in the holes and, despite being molten at their ends to form enlarged ends, they maintain a certain axial sliding play. The plastic material injected in the proximity of the enlarged end hence tends to seep in between such head and the plate, and then to leak out in the gap G (see FIG. 6A) between filaments F and the perimeter H of the holes, which is certainly not sealed due to the very structure of the tufts.

The seepage of plastic material, as may be guessed, causes unpleasant burrs and the possible disassembly of the topography of the tufts on the toothbrush.

Examples of injection techniques are disclosed in EP 567 672, which, however, remain not fully satisfactory.

The object of the present invention is hence that of providing an innovative manufacturing process of a toothbrush as described above, which allows to combine the advantages of the consolidated moulding processes of plastic toothbrushes with the advantageous introduction of a core, in particular a metal core.

A further object of the invention is that of providing a system which allows to perform an injection of plastic material at the desired pressure, even in the proximity of the bristle head, without substantial limitations and without leakages of material occurring between the tufts and the respective holes.

SUMMARY OF THE INVENTION

These objects are achieved through the methods described in short in the accompanying claims.

In particular, according to a first aspect of the invention, a manufacturing process of a toothbrush of plastic material having an inner core is provided, of the type wherein the following steps are provided manufacturing a resistant core, in particular a metal core, introducing said resistant core into a mould cavity formed by opposite footprints belonging to a lower half-mould and to an upper half-mould and, subsequently, injecting molten plastic material into said mould cavity for the manufacture of at least part of the toothbrush handle, and wherein said resistant core is arranged in a respective footprint of a lower half-mould in contact with at least two support platforms, apt to support said core in the proximity of a central line of the mould cavity, and in that before the injection of structural plastic material, said lower half-mould is coupled with an upper half-mould provided with at least one ribbing apt to come in contact with said metal core at least in a position between said support platforms and opposite thereto with respect to the core.

According to a further main aspect of the invention, a mould for a manufacturing process of a plastic toothbrush embedding a resistant core is provided, consisting of at least one footprint in a lower half-mould and one footprint in an upper half-mould, between which a mould cavity for the moulding of at least one first plastic component of a toothbrush is defined, the footprint of the lower half-mould providing at least two support platforms, apt to support a metal core of the toothbrush in the proximity of a central line of the mould cavity, and the footprint of said upper half-mould having a ribbing apt to come in contact with the resistant core at least in a position between said support platforms and in an opposite position thereto with respect to the core.

According to another aspect of the invention, a manufacturing method and a corresponding toothbrush are provided, wherein no use is made of small anchors, comprising the steps of arranging at least one head component provided with holes and equipping it with tufts of synthetic single yarns and melting the bottom ends of such tufts in the shape of heads of a greater width than the diameters of the corresponding holes, and wherein there is provided the further step of completing the back side of said head component by introducing it into a mould and injecting a molten completion material which is subsequently hardened, the method specifically providing that—before said injection of molten material—a protection membrane is applied on said back side, adjacent to the tuft heads, which membrane has such an extension as to cover the heads at least in areas in the proximity of points of injection of said molten material.

BRIEF DESCRIPTION OF THE DRAWINGS

Further features and advantages of the method, of the mould and of the toothbrush according to the invention will be in any case more evident from the following detailed description of some preferred embodiments, given by way of example, and illustrated in the attached drawings, wherein.

DETAILED DESCRIPTION OF SOME PREFERRED EMBODIMENTS

In the following, reference will be made, in an exemplary way, to a toothbrush comprising a metal core, but it is understood that the core might also be made of other materials having individual features with respect to the remaining portion of injectable plastic body.

The Metal Core

In order to manufacture a metal-core toothbrush, a core 1 of metal material is first manufactured, for example such as the one clearly shown in FIG. 1A-1D. The metal core 1 has an elongated, slim profile—especially in the neck portion C, i.e. between the area G of engagement with the head and the handle area I—which is rather thin.

In the embodiment shown in the attached drawings, metal core 1 has an open-V, transversal profile, at least on the entire handle portion and on part of neck C. This profile allows to obtain a good inertia modulus which makes the entire core more rigid to bending, despite reduced material thickness.

The thickness preferably lies in the range 0.2 mm to 3 mm, preferably below 1.5 mm and even more preferably below 1 mm. As a matter of fact, it has been detected that a larger thickness would cause excessive thermal inertia which, depending on the material, would end up making the cooling times and the shrinkage ratios incompatible with those of the plastic material in which the core is intended to be embedded.

A preferred metal material for core 1 is a zinc-and-aluminium based alloy (zama), but it is not ruled out that also other metals may be equally suitable, such as aluminium, stainless steel, copper alloys and so on. An injectable metal alloy, such as a zama alloy, is preferable, which allows to obtain a core having a shape best suited to follow the profile of a toothbrush.

The metal core may be obtained in any case both by microfusion, and by shearing and bending, by MIM techniques, or other.

In the embodiment shown in the drawings, the head portion G of core 1, intended for the coupling with a bristle head, is "racket-shaped". In particular, the head portion G widens transversally with respect to the neck portion C and forks out into three prongs $G_1$, $G_2$ e $G_3$ which join again at the vertex, between which apertures $A_1$ and $A_2$ are defined. This configuration makes the subsequent coupling with a bristle head particularly effective, as will be set forth in the following.

However, the provision of a different coupling element G at the head end of the metal core does not depart from the teachings of the present invention. For example, engaging means (not shown) may simply be provided, intended to remain uncovered at the end of the manufacturing process to then be joined, also by the user himself, to an interchangeable head having a matching shape.

The Bristle Head

Should the bristle head be fixedly joined to the toothbrush, at this point the process according to the invention provides to manufacture a bristle head separately. A head may be manufactured by the most preferred technology for the specific tuft topography which it is intended to offer.

The head consists, in a manner known per se, of a support component 20 provided with a plurality of throughholes 21 wherein bristle tufts 23 are provided to be inserted.

Component 20, being part of the toothbrush itself, is preferably made of a material consistent with that of the toothbrush, for example plastic material such as polypropylene.

Bristle tufts 23 are anchored to support component 20 by the anchor-free technology. The individual tufts 23 are hence inserted into holes 21 by means of suitable tufting equipment (not shown) and then molten at one base end 23a adjacent to the back side 20a (the lower one in FIG. 8) of support component 20. The localised melting of ends 23a, obtained by heat supply or by ultrasounds, causes a joining of the filaments with one another and creates an enlarged head which prevents the withdrawal of the tufts from holes 21 towards the outer side (the top one in FIG. 8) of component 20.

Figure 8:
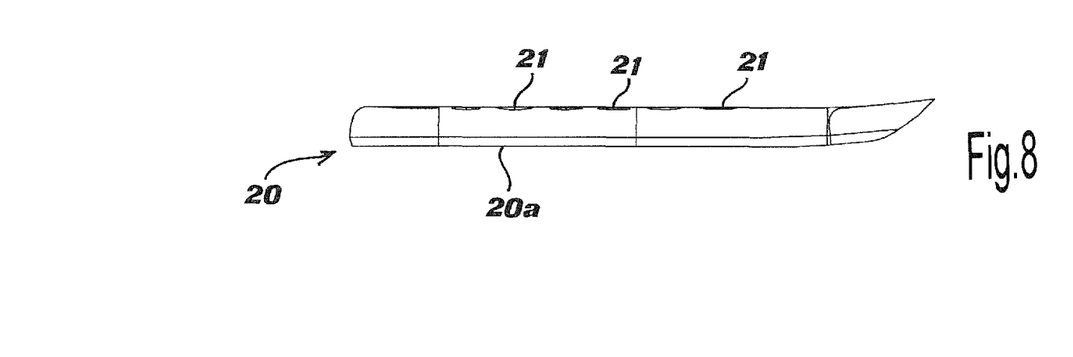
FIG. 8 is an elevation side view of a toothbrush component provided with holes to be tufted.
Figure 9:
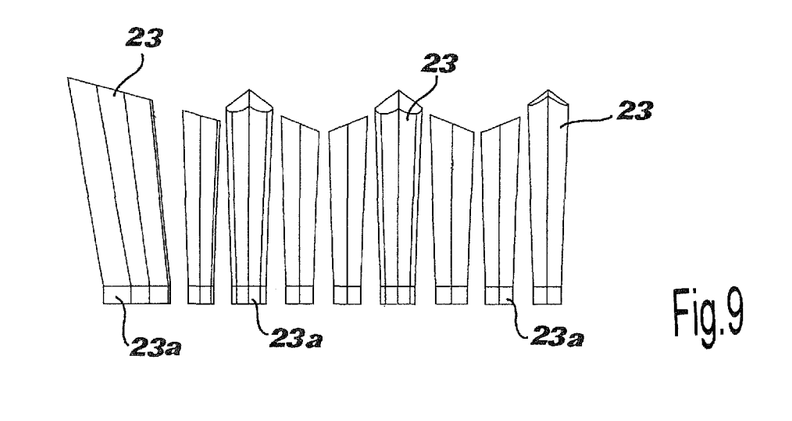
FIG. 9 is an elevation side view of a group of tufts arranged according to the configuration with which they are to be tufted.

Since the melting of ends 23a occurs when the tufts are already inserted in the component or support plate 20, a small adhesion may result between molten heads 23a and the inner side 20a of plate 20, which adhesion, however, cannot be very effective due to the different nature of the two materials. As a matter of fact, the filaments of tufts 23 are typically made of nylon, which melts at a different temperature from that of plate 20.

Moreover, since during the localised tuft melting a partial squashing of tuft heads 23a is caused, a mutual joining between the various heads may also occur, which further eases the anchoring of the tufts on support 20.

However, if tufted plate 20 was thereby introduced in the mould, to inject a back portion finally covering the heads of tufts 23 and provides the completion of the head, the undesired seeping mentioned above would occur.

Figure 10:
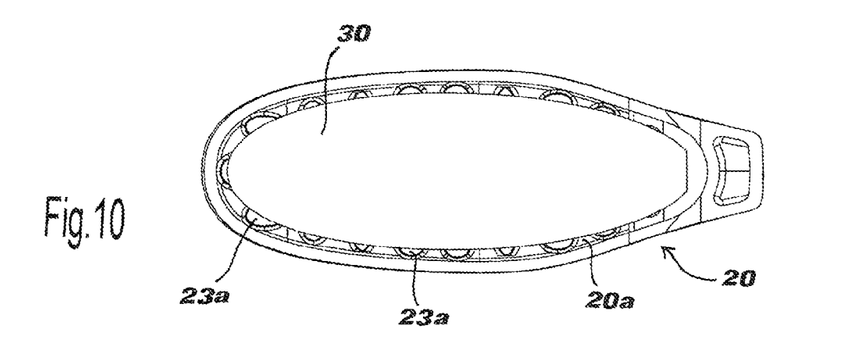
FIG. 10 is a plan view of the back side of the component of FIG. 8 provided with the molten tufts and with a membrane according to the invention.

Therefore, according to the invention, after having assembled the tufts with support 20, it is provided to define/apply a thin protection membrane or film 30 adhering to heads 23a of the tufts, as shown in FIG. 10.

Film 30 has such an extension area as to substantially cover all molten heads 23a of tufts 23 or, at least, those in the proximity of the injection point(s) into the mould intended to produce the back portion of the head.

In FIG. 10, the film has a profile equivalent to that of support 20, but slightly smaller, so as to cover all the heads 23a of the tufts, except part of the peripheral ones.

This configuration is particularly advantageous because it allows to substantially cover all the tuft heads, but leaves a free peripheral rim which ensures an effective bonding of the subsequent injected material to the peripheral portion of support 20.

Film 30 must be of a material which does not melt immediately upon contact with the molten plastic material which is subsequently injected to complete the back portion of the head. This allows to preserve its shielding effectiveness—according to what is set forth below—at least for the entire initial step of the injection, during which the injection pressure is higher.

The Applicant could ascertain that also a paper-based material performs this task very well, since it is inexpensive and easily available and does not burn in the injection step since it is not in contact with oxygen.

According to a more preferred embodiment, protection film 30 has an adhesive side, for example it is an adhesive paper label. As a matter of fact, the adhesive side of the film is placed in contact with tuft heads 23a and allows to apply and keep easily in position the protection film or membrane 30 during the industrial process for the handling and moulding of the toothbrush.

The protection film can also be made of other materials, such as also metal alloys (for example aluminium) or the very material of which the subsequently injected toothbrush head portion is made. For example, it is possible to obtain such shielding film directly in the toothbrush mould, performing a first low-pressure injection in the proximity of the head, so as to define a first shielding film 30 adjacent to the tufts.

In this last case, membrane or film 30 will melt together with the material supplied during the second high-pressure injection of plastic material (the one used to obtain the remaining toothbrush portion), but with a sufficient delay to perform in any case its protective function.

The thickness of membrane 30 depends on the material it is made of, it being proportionally larger in the case of a membrane of a plastic material partly melting at the injection temperatures/pressures. For example, it has been detected that an adhesive paper label can perform its task very well with a thickness of 50-400 μm.

The thickness is in any case preferably such that membrane 30 maintains a certain flexibility, so as to better adapt to the irregular surface 20a of support 20, scattered with the flattened heads 23a of the tufts.

In substance, after having applied protective film/membrane 30, support 20 complete with tufts 23 and with film 30 is ready to be inserted in the toothbrush mould.

Figure 11A:
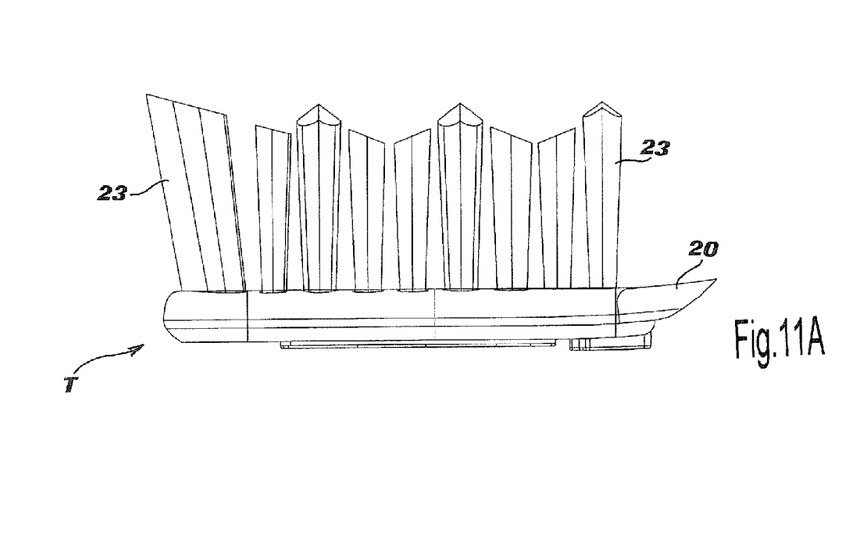
FIGS. 11A and 11B are elevation side and perspective views, respectively, of a full head manufactured according to the method of the invention.
Figure 11B:
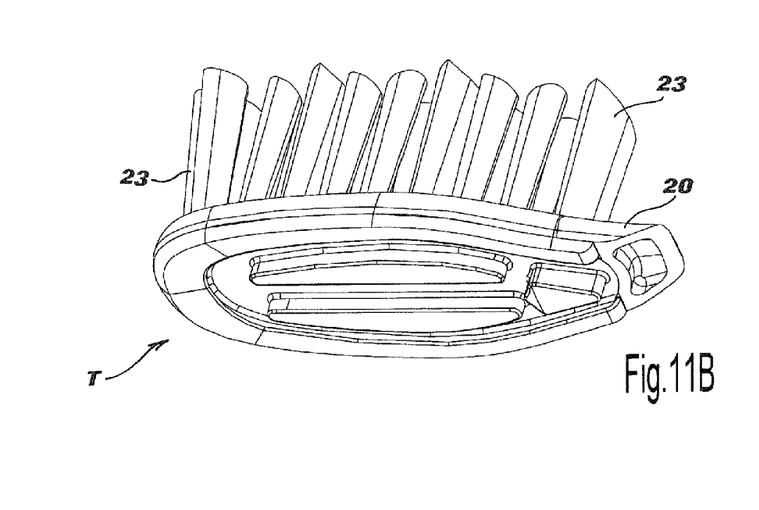

In FIGS. 11A and 11B a head insert T according to a preferred embodiment is shown, once the moulding and hardening (cooling) step of the back portion and the corresponding ejection from the mould has been completed.

As can be seen clearly, in case the head must be coupled with a metal core as shown in the drawings, i.e. with "racket-shaped" head ends, the bristle head displays a back surface provided with a matching footprint. That is, the back of the head has recesses and reliefs in correspondence of prongs $G_1$-$G_3$ and apertures $A_1$-$A_3$, respectively, of the head portion of core 1. This makes the coupling between the core and the head on the adhesion plane thereof potentially stable, so as to prevent undesired relative movements during the moulding step.

Moulding of the First Component

A series of bristle heads T are formed and completed on a metal mask M, by means of which the heads can be handled and transferred along the production line.

Figures 1A, 1B:
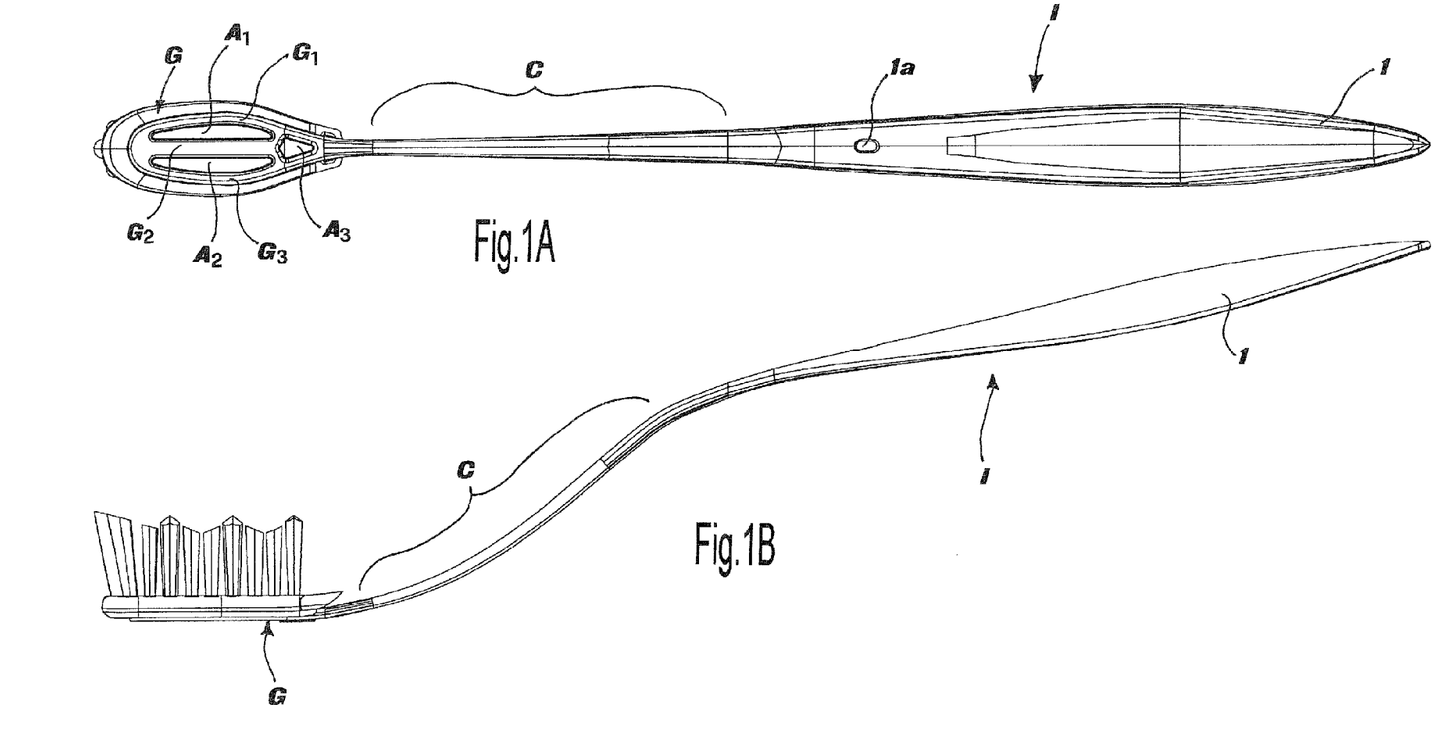
FIGS. 1A-1D are top plan, side elevation, bottom perspective and top perspective views, respectively, of an exemplary metal core joined together with a bristle head.
Figures 1C, 1D:
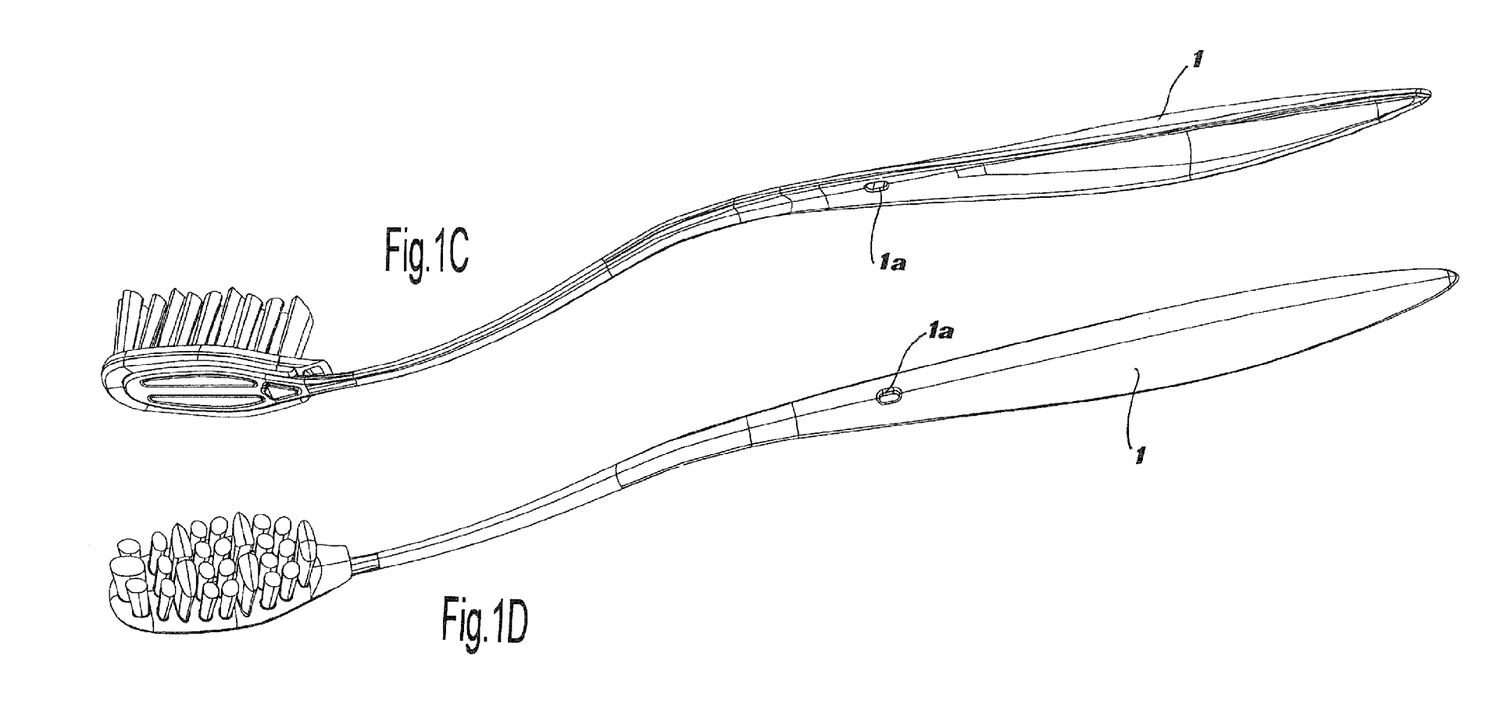
Figure 2:
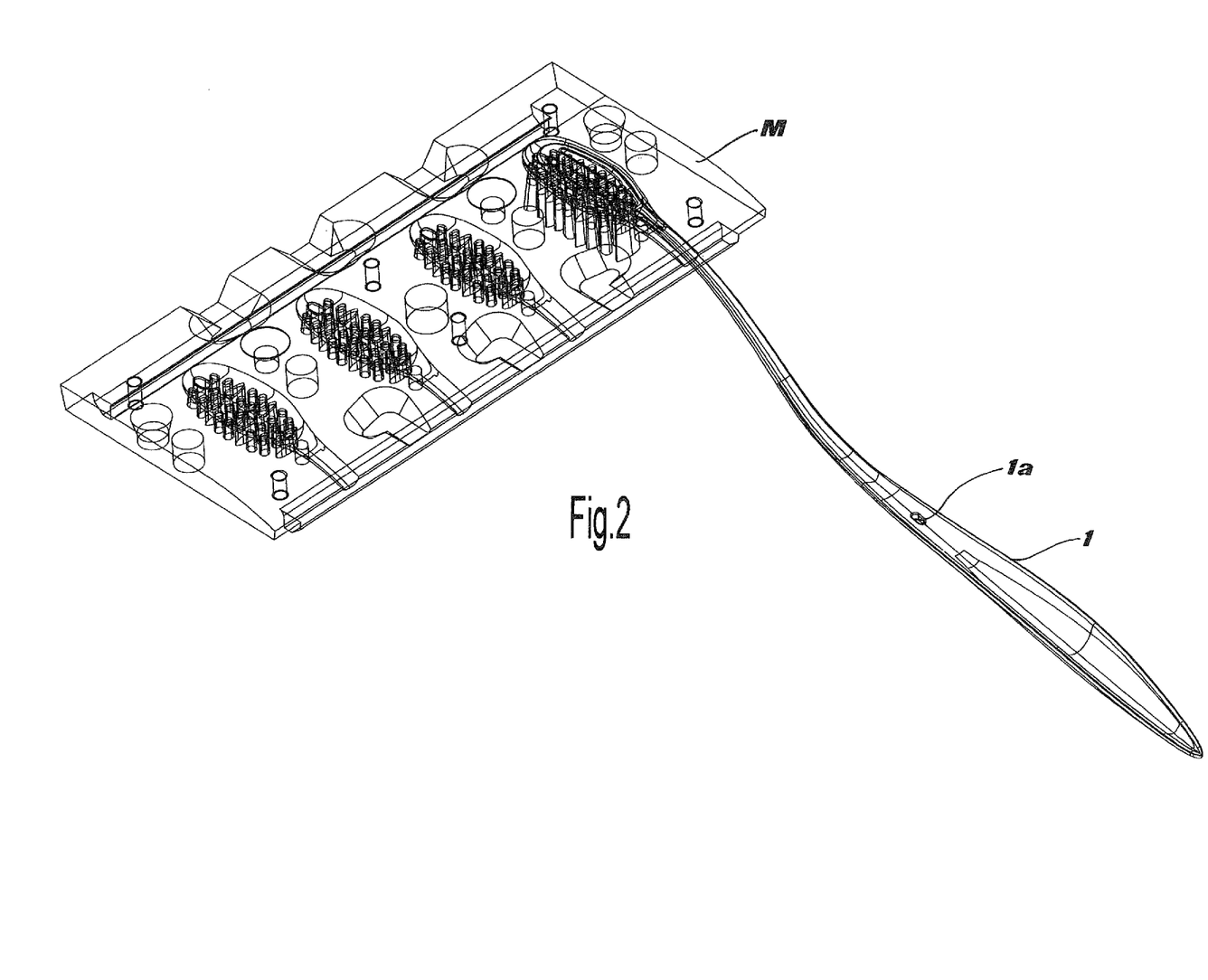
FIG. 2 is a perspective view of the semi-finished product of FIG. 1A joined together to an assembly mask.

Each mask M may comprise, as shown in the drawings, four footprints for an equal number of heads (FIG. 2).

The bristle masks then arrive at an assembling/moulding station in correspondence of which they are housed—for example after having been methodically taken from a storage by a gripping hand with vacuum suction—and locked in a corresponding seat of a lower half-mould $S_1$ of the mould, wherein an equal number of footprints $P_1$-$P_4$ is obtained, which define a part of the mould cavity for a semi-finished toothbrush.

Lower half-mould $S_1$ preferably comprises a footprint number multiple of the number of footprints existing on masks M and is hence arranged for housing a certain number of masks, for example four aligned masks next to one another.

On a rotary turntable (not shown) there are preferably mounted two half-moulds $S_1$, in opposition one to the other, which can thereby be alternatively brought below a moulding head, where a coupling occurs with an upper half-mould $S_2$ and the injection of plastic material of a first component.

Moulding turntable systems, of the prior art, are described for example in EP 893 225 and EP 836 923 in the name of G. B. Boucherie NV.

Figure 3:
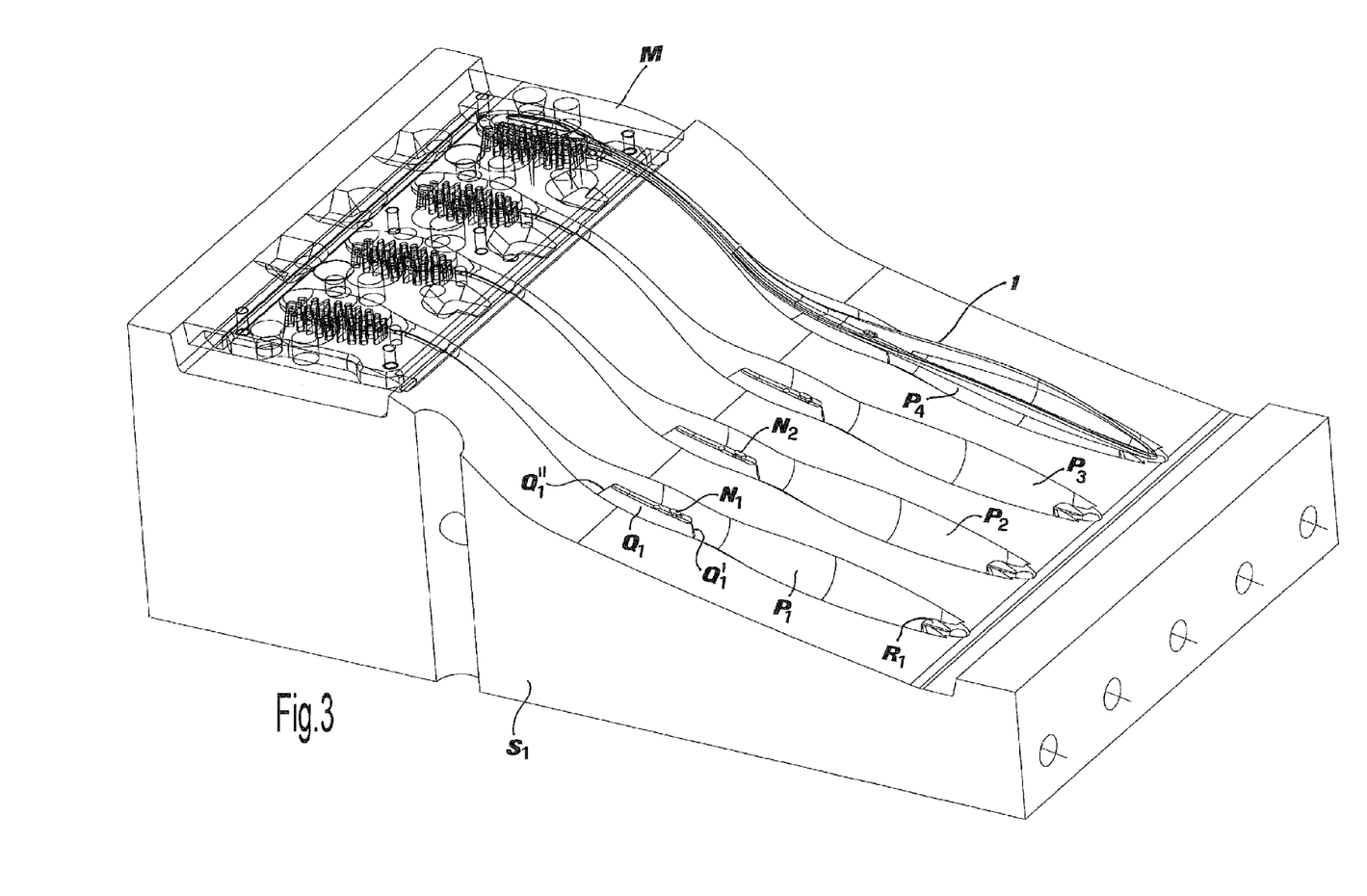
FIG. 3 is a perspective view of a lower half-mould whereto the mask of FIG. 2 is applied.

According to the invention, each of footprints $P_1$-$P_4$ intended to house a metal core 1, as clearly visible in FIG. 3, is provided with two support platforms $Q_1$-$Q_4$ and $R_1$-$R_4$ apt to support and retain core 1 in a central position with respect to the toothbrush body.

In substance, the two support platforms Q and R rise from the bottom of footprint P and define a support or contact surface which lies in the proximity of a central line of the mould cavity, i.e. of the toothbrush.

Preferably, the two platforms are arranged one (R) in the proximity of the handle end of the toothbrush, while the other one (Q) is in the proximity of the CG area of core 1, i.e. in the proximity of the connection between handle portion I and neck portion C.

For correct core retaining in the mould, the surfaces of the two platforms Q and R intended to come in contact with core 1 are preferably shaped so as to match the possibly-curved, corresponding surface conformation of core 1.

Since the two platforms R and Q are intended to occupy part of footprint P, depending on their location, their sizing and shape takes into account the fluidodynamic requirements of the plastic material which must be injected into the mould. In the embodiment shown, CG platform Q displays a minimal length and is rather elongated in the longitudinal direction of the footprint. The upstream edge Q' (leading edge), with respect to the injection point of the plastic material ($Z_1$), has a rising front with a rounded profile; conversely, the downstream edge Q" (trailing edge) displays a tilted front and, possibly, with a more tapered profile.

Moreover, CG support platform Q preferably has a pin N intended to engage with a corresponding hole 1a of metal core 1. The pin projects from the respective platform according to a direction favourable to the introduction of hole 1a during the movement of deposition of core 1 into footprint P.

This pin N has the twofold task of longitudinally centring core 1 in its moulding footprint P, as well as of providing a valid constraint of the same core, which prevents undesired transversal displacements, especially during the pressure injection of the plastic material into the mould.

As a matter of fact, it must be considered that the secure fastening of the core to the inside of the mould cavity is one of the critical points for the success of the finished product. The plastic material is normally injected at a high pressure (even up to the order of 700-800 bar) and hence the push imparted to the inner core would risk shifting it from its position established by the design.

Moreover, hole 1a maintains an advantageous usefulness also during the subsequent step of moulding the plastic material, as will be highlighted further on.

An upper half-mould $S_2$ is furthermore provided to cooperate with lower half-mould $S_1$, so as to define a footprint P' which defines, together with lower footprint P, the moulding cavity of the first component.

According to the invention, upper half-mould $S_2$ also has a support for retaining metal core 1. In particular, the upper half-mould has an elongated ribbing L (the half-mould portion resting on core 1 visible in the section of FIG. 4), intended to come in contact in the cavity of core (i.e. above in the drawing of FIG. 4) in an area lying between the two lower support platforms Q and R and opposite thereto with respect to the core.

Thereby, enclosing metal core 1 between three contact areas (two arranged on one side and one arranged on the opposite side, lying between the first two ones), an effective locking system for core 1 is configured. This locking system avoids any undesired movement of metal core 1 in the mould, especially during the injection of the first plastic component, but at the same time it is very little invasive and hence does not negatively affect the solidity of the moulded plastic material nor its final aesthetic result.

Finally, it is preferable for the two half-moulds $S_1$ and $S_2$ to be shaped so that footprints P and P' house the metal core entirely. In other words, metal core 1 is preferably suited to be fully covered by the plastic material of the first component, except for the areas resting on platforms Q and R and ribbing L.

In particular, it is deemed advantageous for at least the entire peripheral edge of the metal core to be covered with the first structural plastic component, for example polypropylene. This ensures good grafting of the plastic material to the metal core, as well as good bonding of the second (typically elastomeric) component and avoids undesired seepage of the second component between the metal core and the first component.

For such purpose, the support areas (which can be better defined as areas of contact with the metal core) of platforms Q and R and of ribbing L must be sufficiently narrow so as not to affect the peripheral edge area of the core.

Operatively, once metal core 1 has been placed into the lower half-mould (FIG. 3)—well-centred and retained by the insertion of pin N into hole 1a—the turntable in the moulding station is caused to rotate and carries half-mould $S_1$ below the injection head, where it is closed with upper half-mould $S_2$, and the injection of the first plastic structural component, typically made of polypropylene, begins.

Figure 4:
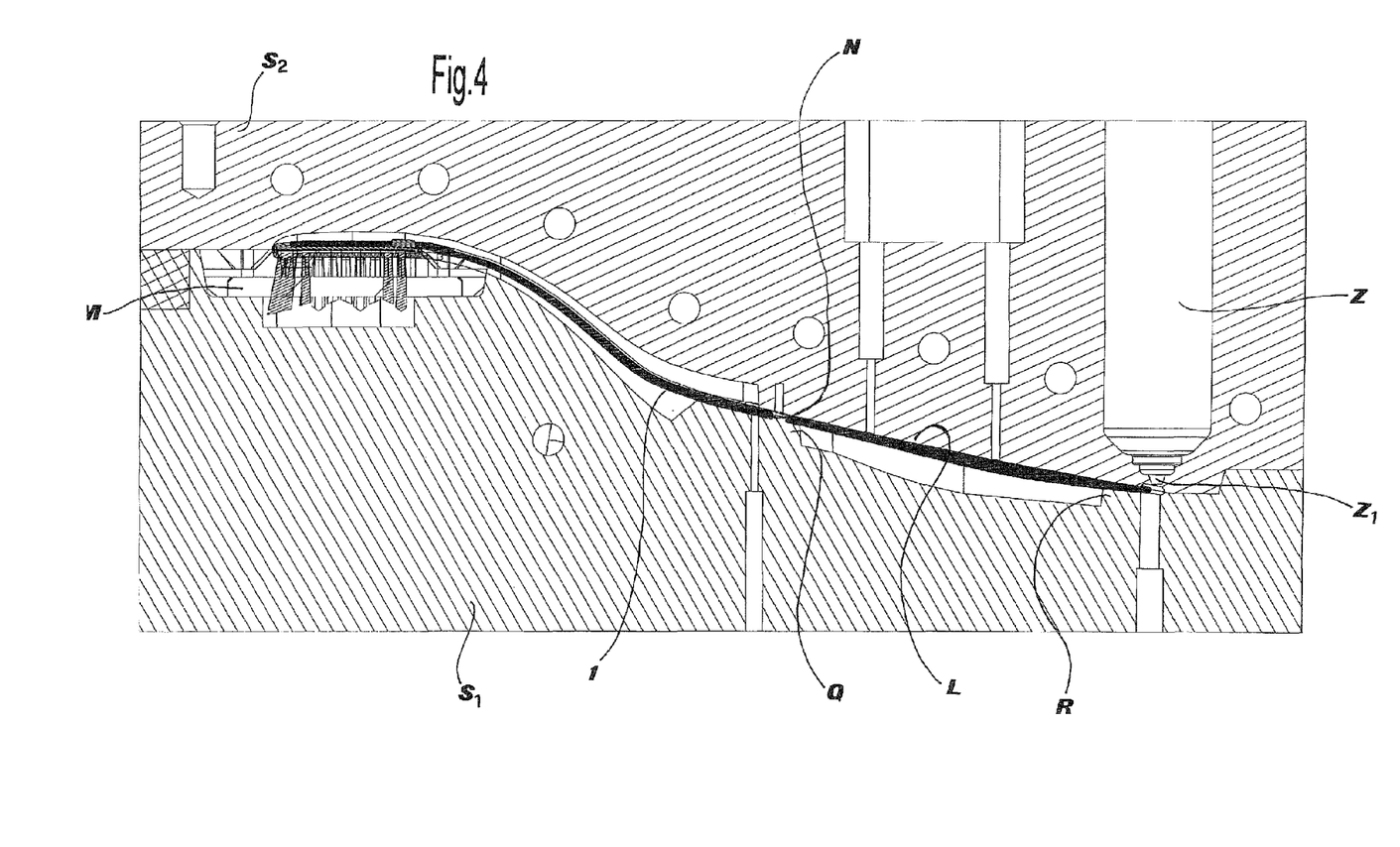
FIG. 4 is a longitudinal-section view taken along the symmetry axis of a full mould according to the invention.
Figures 5A, 5B, 5C, 5D, 5E:
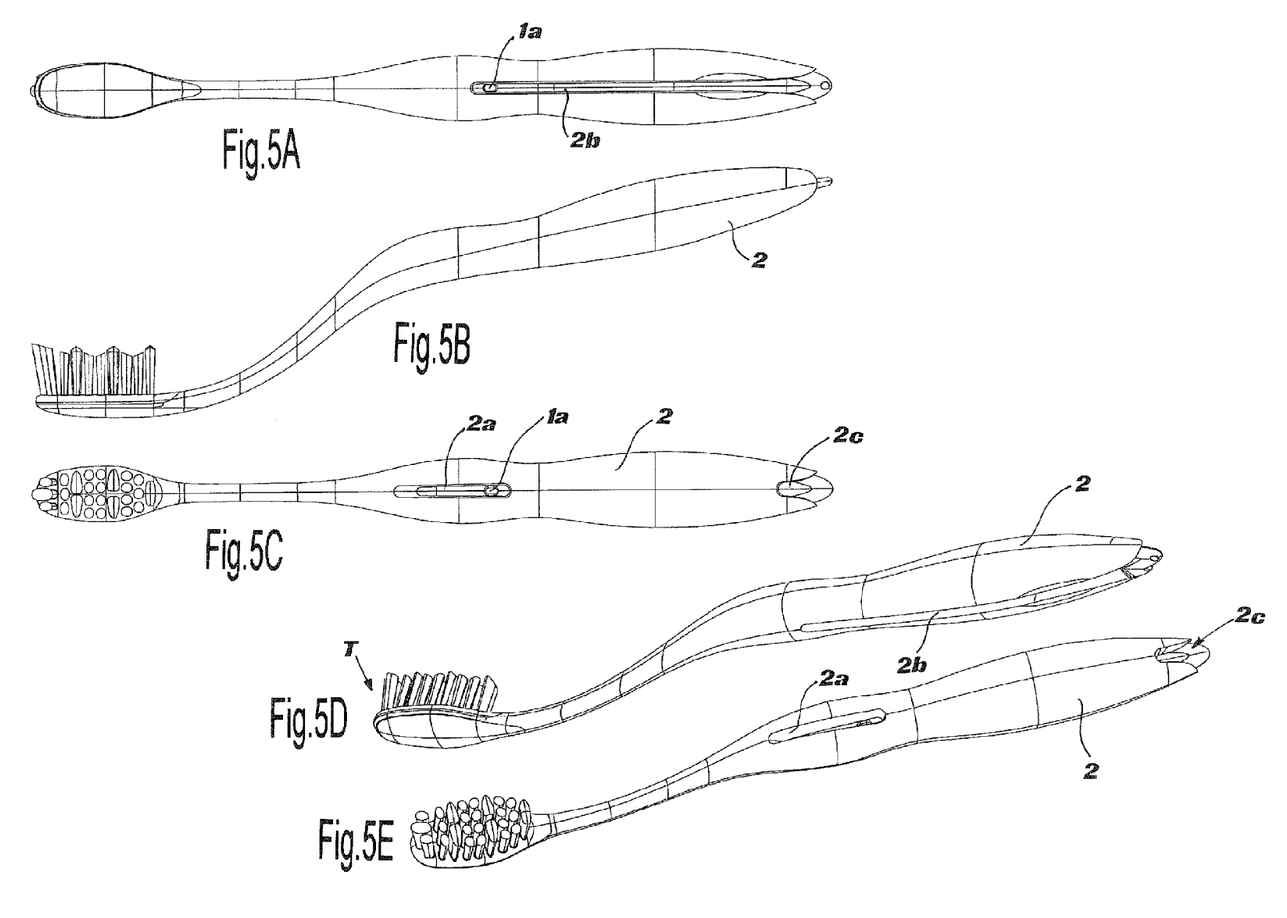
FIGS. 5A-5C are bottom plan, elevation side and top plan views, respectively, of the semi-finished product of FIG. 1 whereto a first component of plastic material has been added.
FIGS. 5D-5E are perspective views of the semi-finished product of FIGS. 5A-5C.

The point of injection of the first component preferably lies in the proximity of the rear end of the handle ($Z_1$ end of channel Z in FIG. 4). The injection, since it occurs at the end of the mould cavity, is preferably pressure controlled, in order to suitably adjust the pressure in the mould and the progress of the injection front. Injection may occur, for example, over 2-3 seconds with three-four different subsequent pressure events.

The fact that core 1 is well-centred along a central line within the mould cavity causes also the cavity volumes on both sides of the core to be substantially balanced: this avoids pressure peaks on either side of core 1, which might otherwise bend the core during injection and move it into an undesired position.

Another point of preventive low-pressure injection may be provided in the proximity of the head, should membrane 30 be provided directly in the mould.

In any case, the plastic material injected at high pressure closes and completes the back of the head.

The plastic material supplied during injection ends up bonding with at least part of the inner side 20a of support 20, in particular along the periphery thereof, being made of identical or substantially compatible and related material.

Due to the presence of membrane 30, found at least in correspondence of the points of injection high-pressure, the injected material is unable to seep below tuft heads 23a—otherwise leaking through the gaps provided with holes 21.

Moreover, the inclusion of membrane 30 comprises no contraindication. On the contrary, through a suitable choice of the materials—for example a clear plastic material (at least once cooled in the condition of use) for the toothbrush head and a variously coloured or patterned support for film 30—it is possible to obtain appealing colour and aesthetic effects.

At the end of moulding, the rotation of the turntable brings the lower half-mould in the initial position, wherefrom the semi-finished products are taken, so as to free half-mould $S_1$ which is ready again for a subsequent loading cycle. In this step, the semi-finished products are as illustrated in FIGS. 5A-5E. In such respect, please notice the recesses left in first component 2 by support platforms Q and R (recesses 2a and 2c, respectively) and by ribbing L (recess 2b).

Moulding of the Second Component

The semi-finished products are then sent to a second mould (possibly arranged on the same turntable or in a second moulding station) where a second finishing plastic component is applied, for example an elastomeric material.

The semi-finished product is therefore introduced, in a manner known per se, into a new mould into which the second component is injected which, in addition to aesthetically finishing the toothbrush, fills the recesses 2a-2c left by the support and locking system of metal core 1.

In this step, advantageously, the finishing and filling plastic material, injected by one of the two parts of hole 1a, for example into the recess 2b left by ribbing L, can overflow also onto the other side. The provision of hole 1a—in addition to the retaining function set forth above—hence allows both to inject plastic material on one side only of the two parts, and to obtain a resistant anchoring of the two opposite masses of elastomeric material to the toothbrush body, because they join through the hole.

Figure 7:
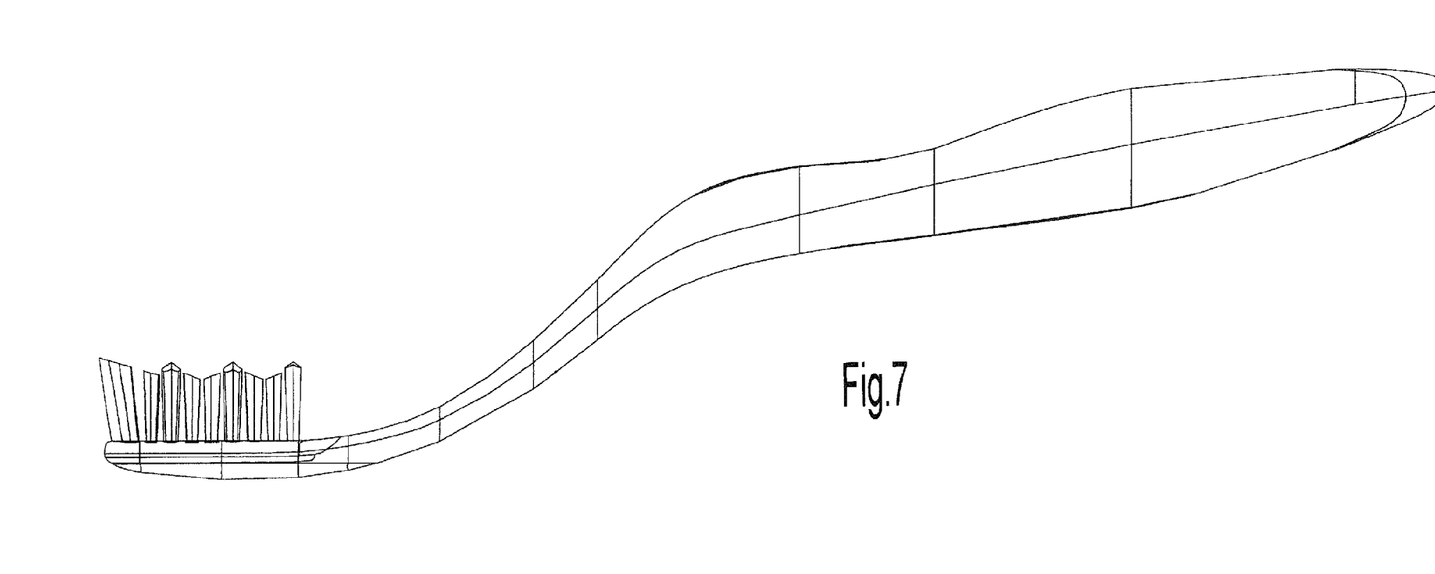
FIG. 7 is an elevation side view of an exemplary full toothbrush.

Once this step too has ended, the toothbrush is complete (FIG. 7) and may be sent to a quality assurance line and then for packaging.

As can be evinced from the above-reported description, the teachings according to the invention allow to define a moulding process and the corresponding mould, particularly suited for obtaining a toothbrush with a slim metal core.

The process, in particular, allows to perfectly embed the metal core into the plastic body of the toothbrush (so as not to leave it exposed to external agents), securely fastening also the bristle head component. The perfect retaining of the core in the mould, despite its slimness, further allows to obtain a product of excellent quality and finishing.

It is nevertheless understood that the invention is not limited to the particular embodiments illustrated above, which are only non-limiting examples of the scope of the invention, but that a number of variants are possible, all within the reach of a person skilled in the field, without departing from the scope of the invention.

For example, instead of providing a single pin N on CG support platform Q, a different coupling element may be provided which holds the metal core at least in its transversal direction inside its footprint P in mould 1.

Also, despite reference always having been made to bristle heads obtained separately and then applied to the remaining handle portion, the method of the invention is well-suited also to manufacture an entire toothbrush, wherein the head portion is integral with the handle and is subsequently bristled with a conventional anchor technique.

Finally, it is not ruled out for the resistant inner core to be made of non-metal materials, possibly having a high elastic modulus, obtaining a product with equivalent features.

The invention claimed is:

1. An anchorless method for manufacturing a toothbrush, comprising the steps of:
arranging at least one head component provided with holes (21) extending therethrough, each of said holes tufted with tufts of synthetic single-yarns;
melting bottom ends of said tufts extending from a back side of said head component such that the bottom ends form heads (23a) with shapes larger than the corresponding holes (21);
substantially covering the heads (23a) of the tufts at said back side (20a) with a protection membrane (30); and
completing the back side (20a) of said head component by injecting a molten material, and subsequently causing the injected molten material to harden,
wherein the protection membrane has such an extension as to substantially cover said tuft heads (23a) at least in areas in a proximity of points of injection of said molten material.

2. The method as claimed in claim 1, wherein said protection membrane (30) is in the shape of a film having such an extension as to cover at least all said tuft heads (23a).

3. The method as claimed in claim 2, wherein said protection membrane (30) has an adhesive side.

4. The method as claimed in claim 2, wherein said protection membrane (30) is made of a same material of which said subsequently injected toothbrush head portion is made.

5. The method as claimed in claim 2, wherein said protection membrane (30) is in the shape of a film having such an extension as to cover all said tuft heads (23a) except for a portion of the peripheral ones.

6. The method as claimed in claim 5, wherein said protection membrane (30) has an adhesive side.

7. The method as claimed in claim 5, wherein said protection membrane (30) is made of a same material of which said subsequently injected toothbrush head portion is made.

8. The method as claimed in claim 1, wherein said protection membrane (30) has an adhesive side.

9. The method as claimed in claim 1, wherein said protection membrane (30) is made of a same material of which said subsequently injected toothbrush head portion is made.

10. The method as claimed in claim 9, wherein said protection membrane (30) is obtained directly in the toothbrush mold, performing a first low-pressure injection in the proximity of the head, so as to define a first shielding membrane adjacent to the tufts.

11. The method as claimed in claim 10, wherein said protection membrane (30) is melt together with a material supplied during a second high-pressure injection of plastic material, with a delay sufficient to perform its protective function.

* * * * *